June 12, 1934. L. A. SHARP 1,962,915
EXTENSION SERVICE CONNECTION
Filed May 15, 1929 2 Sheets-Sheet 1
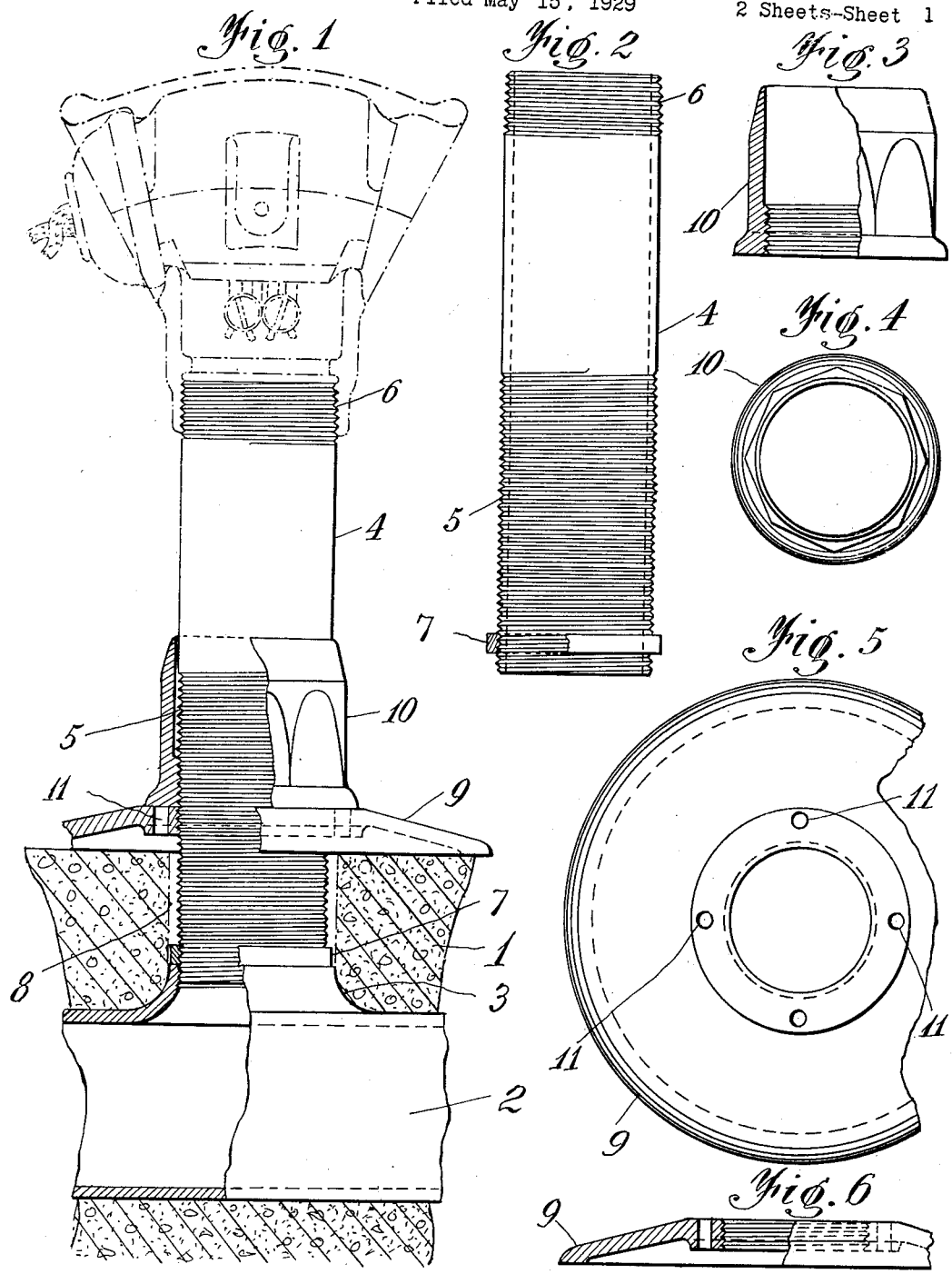

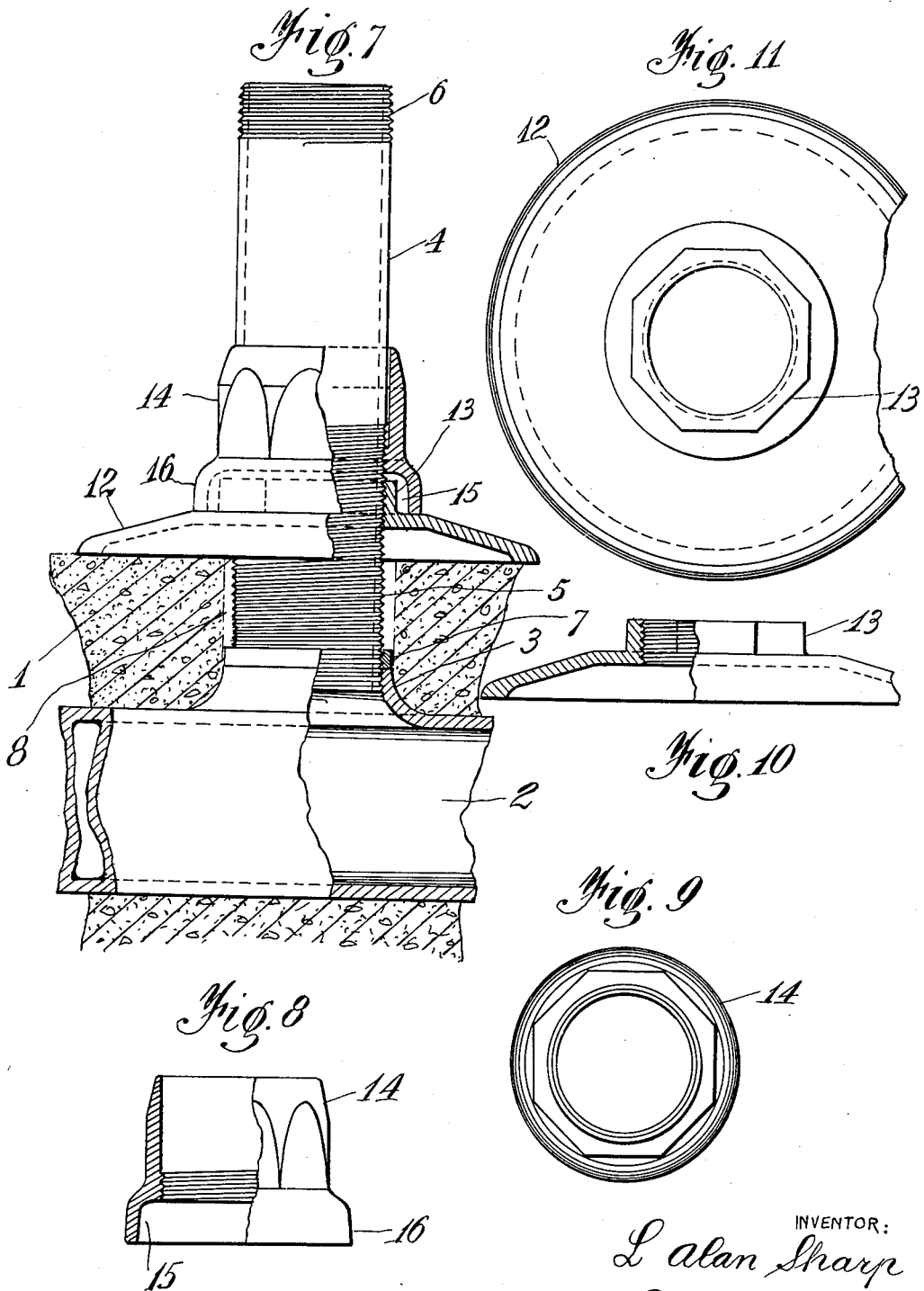

Patented June 12, 1934

1,962,915

UNITED STATES PATENT OFFICE 1,962,915

EXTENSION SERVICE CONNECTION

L. Alan Sharp, Edgeworth, Pa., assignor to National Electric Products Corporation, Pittsburgh, Pa., a corporation of Delaware Application May 15, 1929, Serial No. 363,334

3 Claims. (Cl. 247—28)

This invention relates to new and useful improvements in under floor or under partition duct systems for electrical distribution and more particularly to an extension service connection adapted for use in association with an under floor or under partition duct.

The primary object of the invention resides in providing an extension service connection or stand pipe which may be readily engaged with or disengaged from the embedded conduit or duct by direct connection, providing an unobstructed wire-way and further properly supported and locked with respect to the duct and to the partition of the structure.

Another object of the invention resides in so constructing the extension service connection as to fully protect the parts and elements enclosed therewithin and to further withstand a reasonable amount of abuse in connection with its exposed position.

Still another object resides in providing a stand pipe which is externally threaded and directly connected to the duct below the floor line and providing ornamental and useful means in connection therewith to lock the stand pipe with respect to the floor and simultaneously obscure the threads of the stand pipe projecting above said floor line.

Still another object of the invention resides in providing an extension service connection which has a perfect grounding connection, no adapters, nipples, thimbles or inserts being used to connect the duct with the stand pipe.

Still another object resides in providing a service connection with a minimum of separable electrical grounding contacts.

Another object of the invention is to provide an extension service connection in which the movement of the stand-pipe with the duct may be suitably limited.

Still another object resides in providing an extension service connection with a nut adapted to conceal the plate adjusting means.

A still further object resides in providing a device which is comparatively simple and durable in construction, inexpensive to manufacture which can be easily handled and installed and one which will be very efficient and useful in operation.

With these and numerous other objects in view, the invention consists in the novel features of construction, combination and arrangement of parts as will be hereinafter referred to and more particularly pointed out in the specification and claims.

In describing the invention, reference is had to the drawings in which similar reference characters designate corresponding parts throughout the several views and in which:

Figure 1 is a vertical section of the improved extension service connection disclosed in engagement with a partition duct, the various elements being in assembled position, a duplex receptacle being shown in dot and dash lines applied to the head for purposes of illustration.

Figure 2 is an outline view of a pipe showing a stop collar in the final position thereon.

Figure 3 is a side elevation, partly in section of an improved and ornamental lock nut.

Figure 4 is a top plan view thereof.

Figure 5 is a fragmentary top plan view of the stair or partition flange plate.

Figure 6 is a side elevation, partly in section, of Figure 5.

Figure 7 is a vertical section, showing a modified form of the flange locking means.

Figure 8 is a side elevation, partly in section, of the ornamental lock nut used in connection with the modified form as shown in Figure 7.

Figure 9 is a top plan view of Figure 8.

Figure 10 is a side elevation, partly in section, of the surface or floor flange plate.

Figure 11 is a top plan view thereof.

In extension service connections at present in use, so-called stand-pipes are connected to the duct through the medium of one or more adapters by inserts, thimbles, or by expansible fittings which are attached to the stand-pipe. It is obvious that, in order to obtain a good electrical ground connection and a strong mechanical construction the number of parts uniting a stand-pipe with a duct should be reduced to a minimum.

In the invention herewith described, no intermediate fastening means between the duct and the stand-pipes are used, thereby eliminating "grounding" trouble.

In describing the invention, reference is had to the drawings in which similar reference characters designate corresponding parts throughout the several views and in which 1 designates a cement floor of a structure below the upper line of which is embedded the duct 2, which is provided under the floor or in the partition in the construction of the building. The term partition is used in its broad sense and it is intended to cover outside building walls, interior partitions, floor partitions and, in fact, any portion of a building construction which separates one space in the building from another. The duct at regular intervals throughout its length is provided on the upper wall thereof with integral, upstanding and internally threaded bosses 3 which, ordinarily, are of a height less than the distance to the floor line of the structure. The improved extension service connection is adapted for engagement with the aforesaid bosses, as will appear in detail herebelow.

The improved extension service connection comprises a stand-pipe 4 which from its lower edge is externally threaded for a good portion of its length, as shown at 5 and also externally threaded at its upper end as shown at 6. The lower threaded end of the stand-pipe is adapted to engage the internally threaded and upstanding boss 3, as clearly shown in Figures 1 and 7 of the drawings and soldered or otherwise fastened at a predetermined distance from the lower end of the stand-pipe, externally thereof is a stop collar 7 which is adapted to engage the upper peripheral edge of the boss 3 and limit the movement of the stand-pipe 4 with respect to the duct 2 and lock the stand-pipe substantially with respect to said duct, as appears obvious.

An opening 8 of course is provided in the floor 1 through which the stand-pipe 4 projects and into which the boss 3 projects. Prior to the introduction of the stand-pipe into this opening 8, any desired or preferred covering may be provided therefor. It will be seen however, that the threaded portion of the stand-pipe 4 from the lower end thereof projects above the floor line.

Threaded onto the portion 5 of the stand-pipe is a flange plate 9 which is adapted to engage the floor line when the device is assembled and applied to use and obviously the same retains the stand-pipe securely to the floor when projecting thereabove. In order to lock the flange plate 9 in position and also to provide means for covering the projecting threads 5 on the stand-pipe, an ornamental lock nut 10 is provided which is internally threaded and engaged with the threads 5, as appears clearly in Figure 1 of the drawings.

As indicated, this lock nut is ornamentally designed to give the most pleasing effect, at the same time locking the base flange in position and covering the threads of the stand-pipe.

Engaged with the upper threaded end 6 at the stand-pipe 4 is a service head which may be of any desired construction, for holding an electric receptacle.

It may be here stated that the flange plate 9 applied to the stand-pipe 4 is provided adjacent its threaded opening with openings 11 which permit a spanner wrench or the like to be engaged therewith for turning home said flange. The lower end of the lock nut 10, as seen in Figures 3 and 4 particularly is slightly enlarged so that when said nut is turned home on the stand-pipe against the flange plate, the openings 11 will be covered thereby, thus presenting a neat appearing connection and at the same time preventing dust and dirt from collecting in said openings.

In Figures 7 to 11 inclusive there is shown a slightly modified form of the invention. In this case, the plate flange 12 is provided with a plurality of flat surfaces 13 to which a wrench may be applied for raising or lowering said plate flange, and the ornamental nut 14 has a recess 15 at its lower end 16 by means of which the flat surfaces 13 may be concealed.

As in the preferred form, the nut 14 not only serves as a means of locking the flange plate 12, but also hides or conceals the unused threads of the pipe 4, and the polygonal wrench gripping faces of the flange plate 12.

From the foregoing description of the construction of these improved devices the operation thereof and the manner of applying the same to use will be readily understood and it will be seen that there is provided a simple, inexpensive and efficient means for carrying out the many objects of the invention.

While there is particularly described the elements best adapted to perform the functions set forth, it is obvious that various changes in form, proportion and in the minor details of construction may be resorted to, without departing from the spirit or sacrificing any of the principles of the invention.

What is claimed is:—

1. In an under floor duct system the combination with a duct having an internally threaded and upstanding boss formed thereon; of a service extension connection including a stand-pipe externally threaded from its lower end for a goodly portion of its length, the lower end of said stand-pipe being engaged with said boss, means for limiting the movement of the stand-pipe with respect to said boss, a flange engaged with the threads of said stand-pipe and adapted to contact with the floor line, a lock nut engaged with the threaded portion of said stand-pipe to secure the flange in contact with the partition surface and simultaneously obscure the threads on the stand-pipe from view.

2. In a concealed duct system the combination with a duct having an opening therein, of a one piece service extension connection in direct engagement with said duct opening; a building partition enclosing the duct; a flange adapted to be adjusted on said service extension to externally engage the partition surface and a nut positioned on the service extension and provided with means to conceal the adjusting means of said flange.

3. In a concealed duct system the combination with a duct having an opening therein, of a one piece service extension connection in direct engagement with said duct opening; a building partition enclosing the duct; a flange adapted to be adjusted on said service extension to externally engage the partition surface; a nut on said service extension adapted to come into locking engagement with said flange and means provided in said nut to conceal the adjusting means of said flange.

L. ALAN SHARP.